April 17, 1951    M. J. RADECKI ET AL    2,549,384
BAND SAW MACHINE
Filed May 9, 1945    3 Sheets-Sheet 1

INVENTORS
Michael J. Radecki
Joseph A. Krolikowski
BY Watson, Bristol, Johnson & Leavenworth
ATTORNEYS

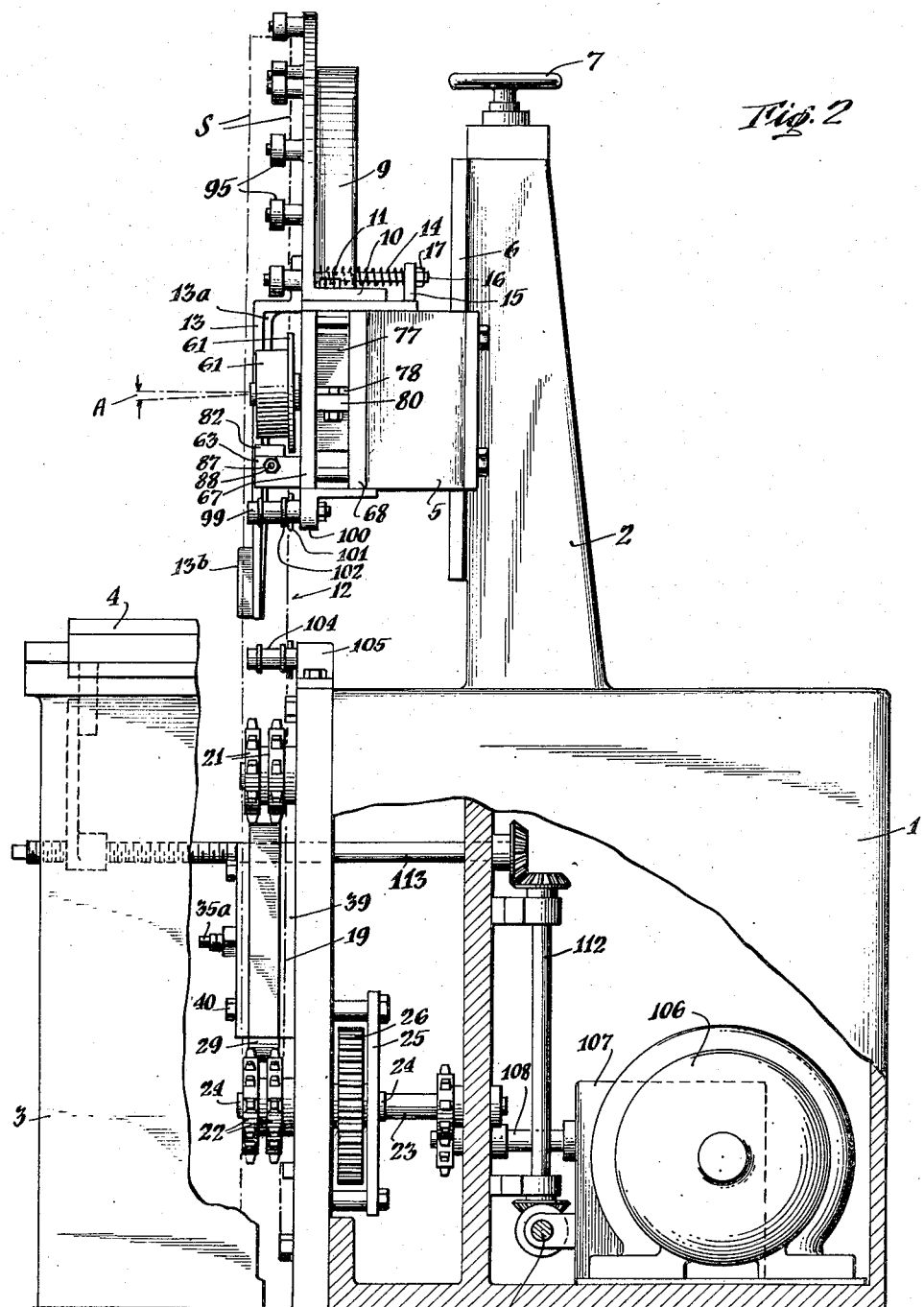

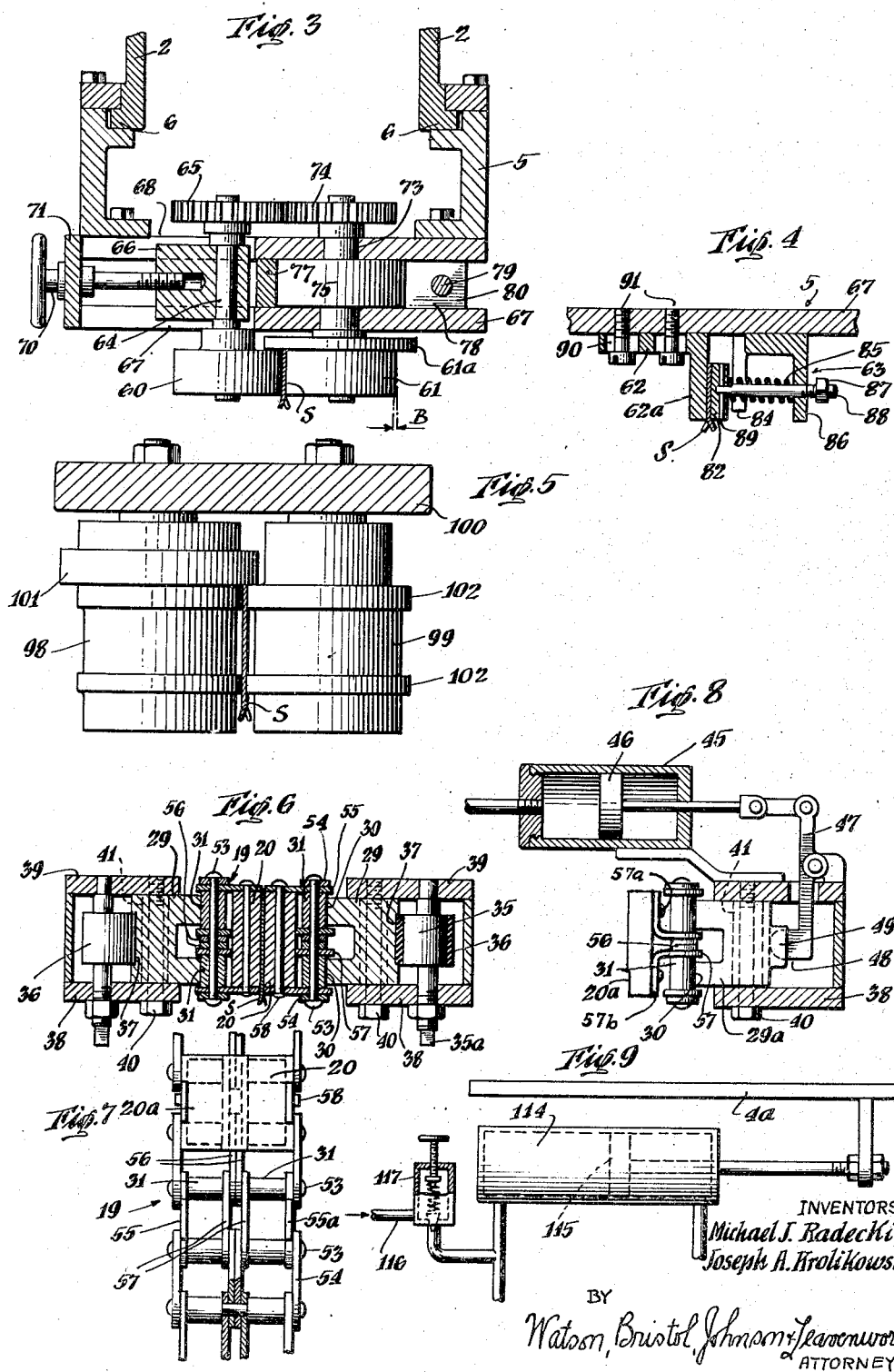

Patented Apr. 17, 1951

2,549,384

UNITED STATES PATENT OFFICE 2,549,384

BAND SAW MACHINE

Michael Joseph Radecki, Hamden, and Joseph Anthony Krolikowski, New Haven, Conn., assignors to The Henry G. Thompson & Son Company, New Haven, Conn., a corporation of Connecticut Application May 9, 1945, Serial No. 592,852

7 Claims. (Cl. 29—68)

The invention is concerned with metal cutting band saw machines. Although possessing characteristics rendering it of advantage in the operation of band saws in general, it is particularly adapted to make possible the practical use of high speed steel in a band saw. While high speed steel has long been used for the blades of power driven hack sawing machines, previous efforts to utilize high speed steel in band saws have not been successful.

The invention resides in a new combination of mechanical elements, many of which, at least, may be well known per se but are here associated in a novel manner to achieve unusual and markedly successful and useful results.

A particularly important feature of the invention resides in an arrangement whereby the saw pulling or advancing means acts on the saw in a straight line and the entire portion of the band subjected to tension is altogether free of bending stresses. As illustrated in the embodiment of the invention in the drawings, the pulling means comprises a pair of flexible chains adapted to travel in parallel opposed relation and provided with flat plate-like elements arranged to grip the saw band firmly between opposed pairs of the plates and maintain it straight while being advanced. The advancing means is associated with a saw band holding and restraining means of a character which is dependable and adapted to impose a steady uniform tension on the band and keep it running true, with the back edge maintained against and supported by guides provided for that purpose.

The remaining portion of the band, comprising the return run or flight from the pulling means around to the restraining or braking means, is maintained in a wide open loosely running loop, free of tension and at no point moving on an arc of small radius or abrupt change of direction. Provision is made for adjusting the position of the restraining means relative to the pulling means to accommodate workpieces of different sizes without disturbing the above described relation. Also, band saws of different total length may be employed without substantial change in the character of the supporting means and running path of the band.

Other features and characteristics of the apparatus will be made apparent from the description to follow, of the complete embodiment. In general, the arrangement is such as to enable the use of specially constructed high speed steel band saws and to accomplish in a band sawing machine the high rate of cutting speed which high speed steel makes possible. Due to their sensitiveness to certain types of stresses, previous attempts to employ high speed steel band saws have resulted in excessive breakage and short life. The machine of the present invention has obviated these difficulties, and, when provided with a band saw compatible with its power and speed of operation, is capable of achieving unusual cutting rates and of operating on materials of extreme hardness or toughness with a maximum of speed and a minimum of saw breakage and wear.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 2 is a side elevation of the same;

Fig. 3 is a fragmentary cross-sectional view taken on the line 3—3 of Fig. 1, showing some details of the brake drums and associated brake mechanism;

Fig. 4 is a fragmentary cross-sectional view taken on the line 4—4 of Fig. 1, showing the stationary band restraining means;

Fig. 5 is an enlarged view, in plan, of one of the pairs of saw guiding rolls;

Fig. 6 is a fragmentary cross-sectional view of the band pulling means, taken on the line 6—6 of Fig. 1, showing details of the chain block pressure means but embodying a modified form of chain support for the blocks;

Fig. 7 is a plan view of a section of one of the roller drive chains;

Fig. 8 is a somewhat diagrammatic view of a fluid pressure means for producing elastic pressure on one of the chain pressure plates; and Fig. 9 is a fragmentary diagrammatic view of a modified form of work table traversing means employing fluid pressure.

Figure 1:
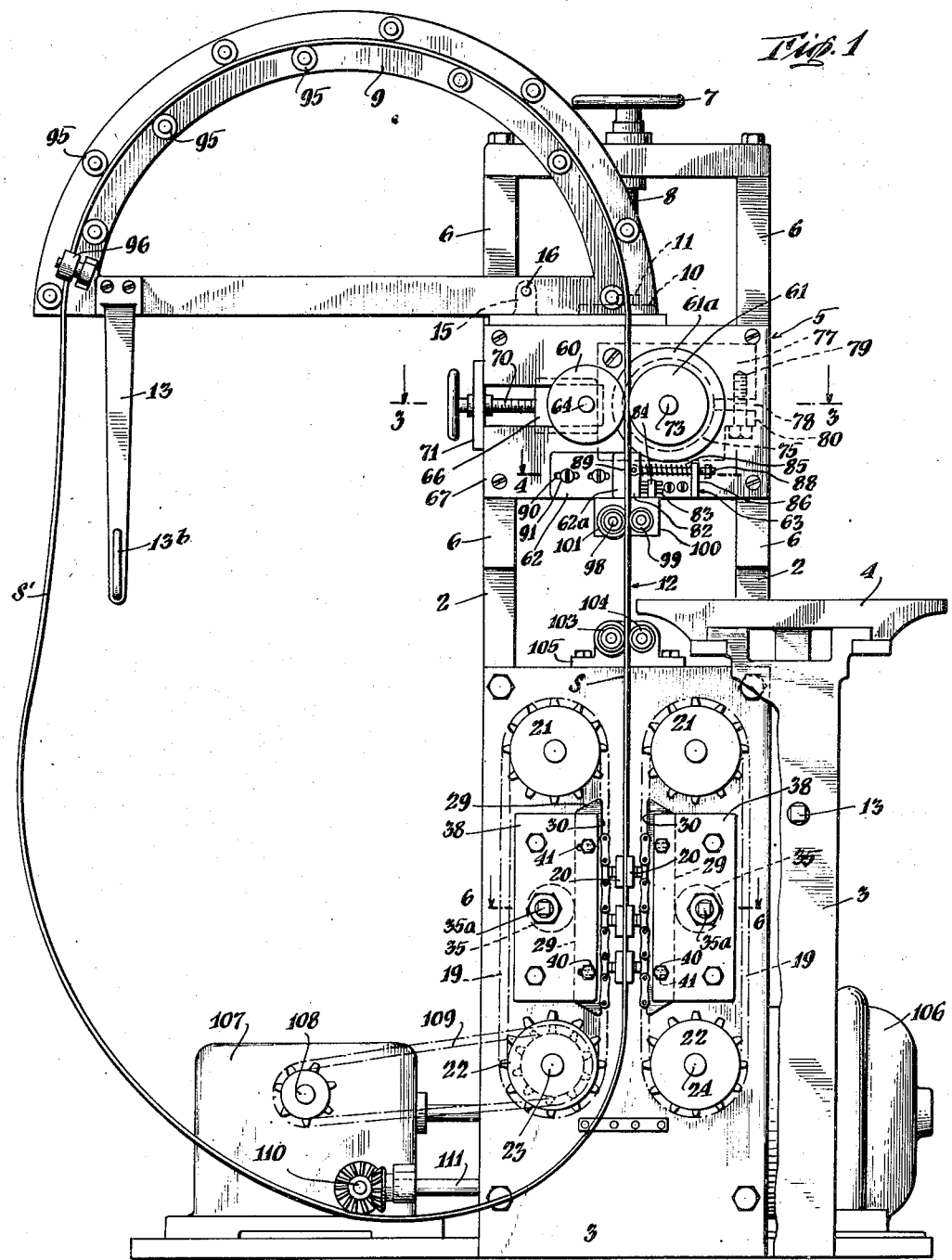
Fig. 1 is a front elevation of the complete machine.

The main elements of a machine embodying the principles of the invention comprises an endless saw band propelled continuously in a single direction in association with a work-piece support, either the saw supporting head or the work support being fed slowly in relation to the other in a direction to effect the cut. The machine may be of a generally vertical type with the plane of the saw band in a substantially vertical position, or of the horizontal type with the plane of the saw band at or approaching the horizontal and with the relative cutting feed either up or down, depending on the direction in which the saw teeth face.

Figs. 1 and 2 of the drawings show a machine of the generally vertical type and in which the relative feed between the saw supporting head and the work support is effected by translation of the latter. The main frame has a box-like base 1 with a vertical column 2 mounted thereon and also has a forwardly projecting supporting base portion 3 adapted to carry the slidable table 4. The column 2 has mounted thereon the head 5 adapted to be adjusted to and secured in any desired vertical position on the ways 6 by a suitable conventional means. A hand wheel 7 designed to operate a rotary screw shaft 8 illustrates one way of so adjusting the head. The adjustable head 5 has mounted thereon an arc-shaped supporting member 9 with a base part 10 which is secured to the head 5 by a bolt 11 about which it is adapted to pivot in a horizontal direction for a purpose to be described. The continuous band saw is indicated at S.

In cutting off short sections of metal the workpiece normally would be mounted in a vise on the work table with an end projecting into the cutting area 12, and there would be no interference between the work-piece and the outer return run S' of the saw. The nature of the work in some cases, however, may result in the bar extending to the left in Fig. 1 far enough to be engaged by the return run of the saw. To avoid this, means are provided for automatically swinging back the supporting arm 9 to the degree necessary. The particular means disclosed for this purpose comprises a depending finger 13 rigidly secured to the arm 9 near its outer end. The finger may have a suitable webbing reinforcement 13a to lend stiffness and at its lower end a forwardly projecting thin flange 13b. This flange extends a small distance forwardly of the saw teeth at the return run S' of the saw so as to be engaged by the work bar before it engages the saw. To insure that the finger will be contacted at the proper time by an irregularly shaped work bar, the finger 13 may be vertically adjustable or, as shown, the flange 13b may have a vertical extent substantially equal to that of the working space 12. As the work bar advances in cutting, it will engage the part 13b and progressively swing the arm 9 on its pivot which will carry with it the saw so as to maintain the saw just ahead of the bar. The amount of angular displacement of the arm 9 and outer run of the saw will be substantially that required to avoid the interference and no more. Suitable spring means may be provided to restore the arm when the work bar is withdrawn. The means disclosed comprises a spring 14 compressed between the arm 9 and a stationary lug 15. The spring encircles a rod 16, one end of which is secured in the arm 9 and the other end of which passes loosely through an enlarged opening in the lug 15 and is threaded to receive a nut 17 which limits the return movement of the arm.

The means for advancing the band saw is, in general, of the caterpillar type and comprises a pair of continuous roller chains 19 having mounted thereon the blocks 20. The saw S is gripped progressively between opposed pairs of blocks, as shown particularly in Fig. 1. Each chain is engaged around a pair of vertically spaced double sprockets 21 and 22, the sprocket 22 at the left being keyed on a shaft 23 which projects rearwardly and is power diven in a manner to be described. The lower sprocket at the right in Fig. 1 is mounted on a shorter shaft 24, each of the shafts 23 and 24 being provided at the rear of the partition 25 of the frame with a gear 26, which are in mesh one with the other and keyed on their respective shafts, whereby rotary drive applied to the shaft 23 drives the two gears, and, the gears being of equal diameter, maintain the driving chains in timed relation with the blocks of the respective chains advancing in opposed pairs. The upper sprockets 21 may be idlers.

The opposed blocks on the chains are urged into tight gripping contact with the saw by similar means at each side of the saw, comprising a shoe 29 providing, as shown particularly in Fig. 6, a pair of track surfaces 30 upon which ride rollers 31 of the respective chains. The shoe is adjusted and held in engagement with the chain by means of an eccentric 35 rotatable by means of the squared end 35a in a rectangular block 36, the block in turn engaging against the shoe 29. The shoe preferably has a channel 37 into which the block 36 projects and is free to slide longitudinally of the channel. The shoe is guided between a front plate 38 and a rear plate 39 bolted together. A pair of bolts 40 pass through the two supporting side plates and also through the shoe. For this purpose, the shoe has openings 41 which are laterally elongated to form slots, as shown particularly in Fig. 6, permitting forward adjustment of the shoe to the desired position. The eccentric is located at substantially the midpoint of the shoe in the vertical plane of Fig. 1, and comprises a pivot permitting a limited amount of anguluar movement of the shoe thereabout and thereby to be self-adjusting so that equal pressure is exerted along its range of contact with the chain.

In some cases, it may be preferable to provide an impositive or elastic type of means for producing the gripping pressure on the chains, and a suitable modified power pressure means of that character for one of the shoes is shown in Fig. 8. The construction comprises a shoe 29a which has associated therewith a fluid pressure operating cylinder 45 having therein a piston 46 linked to the pivoted lever 47, the opposite end of the lever having a rounded projecting portion 48 adapted to engage against the shoe 29a between a pair of spaced lugs 49 integral with the shoe. The lever engages the shoe at substantially the midpoint thereof, similar to the position of the eccentric means shown in Fig. 1. The cylinder 45 is maintained in communication with a source of fluid, such as a hydraulic fluid, at a substantially constant pressure during operation of the machine. The opposing shoe may be of any rigidly supported type, for example, like that shown in the main figures. In connection with the adjustable means, it is noted that it is desirable when the machine is not in use to relieve the pressure on the saw since maintenance of pressure thereon at localized points over long periods of time has damaging effects on the saw. The present construction, either that employing the eccentric means or the hydraulic pressure means of Fig. 8, provides a ready means for quickly relieving or applying the pressure on the shoe.

The chain and method of supporting the blocks thereon may vary as to arrangement and construction. In general, the elements include axially aligned rolls 31 on a common pin 53, the pins being joined on the outside by alternate link plates 54 and 55 and at the mid-portion between the two rolls by alternate pairs of links 56 and 57. In the construction of Fig. 9 the links 57 have right-angle portions 57a extending from their mid-portion, upon which the blocks 20 rest and are secured thereto by screws 57b. The organization of Fig. 1 is not intended to depict any specific form of chain and block construction, but the general showing conforms to the type of construction in this respect of Fig. 8. In the particular form of Figs. 6 and 7, the alternate links 55 each have a lug or ear portion 55a projecting outwardly from the central part and adapted to support one of the blocks 20 between each pair of lugs 55a. The ends of the blocks are provided with suitable recesses to receive the lugs and a block supporting pin 58 extends through the spaced lugs and the intervening block as shown in cross-section in Fig. 6. This is also shown at the upper part of Fig. 7, where one block is assembled in position, the lower blocks being omitted in this view better to show the link and roller details. The construction described provides an exceptionally strong and rigid support for the individual blocks, it being noted in this respect that each block rests on the outer edge of each of four spaced link plates comprising the outside link plates 55 and the intermediate link plates 57 which are spaced from each other as well as from the link plates 55. Accordingly, if the pressure is not evenly distributed across the block from one side of the chain to the other or is localized at one side, there nevertheless is ample support without exerting any torsional stress on the link plates. Other forms of chain and block constructions have been employed successfully, but the construction of Figs. 6 and 7 has particular advantages, as noted. This particular chain construction is, however, the sole invention of applicant Joseph A. Krolikowski and is not claimed per se herein.

As shown in Fig. 6, the width of the blocks from side to side of the chain is less than the width of the normal saw to be employed therewith, the toothed edge extending beyond the blocks so as not to injure the saw set. Saws of different width may be employed, however, this affecting only the extent to which the toothed edge projects beyond the blocks. If desired, the blocks may be made wider and provided with a depressed region or recess to accommodate the teeth as shown at 20a in Fig. 8.

As an important feature of the present invention, it is noted that the blocks 20 are composed of a material which is relatively soft, particularly as compared with the material of the band saw, so that they do not mar the smooth surface of the band. Copper or bronze has been found particularly successful for this purpose. Materials of such character exhibit an unusual effect in that small chips of hard metal soon become embedded in the saw gripping surfaces of the blocks and assist materially in giving a good grip and preventing slippage of the saw.

Restraining or braking means for the band saw are mounted on the adjustable head 5 and comprise a pair of rotary drums 60 and 61 and a pair of opposed pressure plates indicated generally at 62 and 63. The drum 60 is keyed to a shaft 64 which also has keyed thereon a gear 65. The drum 60 is adjustable forwardly into engagement with the saw band by means, portions of which are shown in the cross-section of Fig. 3. The shaft 64 is journaled in a block 66 slidable horizontally between the front and rear plates 67 and 68 respectively. The block is provided with horizontally projecting portions which extend into horizontal slots in the respective supporting plates 67 and 68. As shown particularly in Fig. 3, an adjusting bolt 70 is freely rotatable in the cap plate 71 but is restrained against axial movement, and the inner end of the bolt 70 is threadedly engaged in the block 66, whereby rotation of the bolt serves to adjust the block and thereby the drum 60 into engagement with or away from the band saw S. The opposing drum 61 is keyed on a shaft 73 which also at the rear has a gear 74 which meshes with and has the same diameter as the gear 65, thereby causing the drums 60 and 61 to rotate in uniform timed relation. Mounted in a slot in the head 5 is a brake mechanism which includes a drum 75 keyed to the shaft 73 and provided with a suitable surface of brake lining material. The drum 75 is surrounded by a brake block 77 provided with a split opening 78 and a setscrew 79 freely rotatable in the ear 80 and threaded into the opposing portion of the brake block 77, whereby the degree of pressure on the brake drum and correspondingly the restraining force of the rotary brake mechanism are adjustable.

The details of the stationary brake plates 62 and 63 are shown more clearly in Figs. 1 and 4. The band saw S is designed to be gripped between the rigidly mounted outwardly projecting flange portion 62a and the spring pressed plate 82. The plate 82 is supported from the bracket plate 63 by means of a pair of pins 83 rigidly secured in the plate 82, and freely slidable in openings in a lug 84 on the plate 63. Elastic pressure is imposed on plate 82 and in turn on the band saw by means of a spring 85 compressed between the plate 82 and the angle plate portion 86 of the bracket 63. When the saw is not in use or is desired to be released for any reason, the pressure plate 82 may be retracted against the spring pressure by operation of the nut 87 on bolt 88, the latter being secured at its inner end in the plate 82 by means of a pin 89 passing through an eye in the end of bolt 88. Plate 62 is provided with elongated openings 90 whereby it may be adjusted as to position and clamped by means of the setscrews 91. The saw contacting surfaces of the plates 62 and 82 are preferably of a special alloy to withstand better the wear. The relative degree or proportion of the restraint effected by the stationary and rotary means described may be varied. For example, the major restraint may be effected by the stationary means, in which case the spring 85 would be quite stiff and strong. A total spring pressure in the neighborhood of 1000 lbs. has been employed.

The combination of brake means described, operates in an exceptionally smooth and reliable manner and also is arranged to maintain the saw in alignment with the rear edge thereof in contact with the enlarged flange portion 61a integral with the drum 61. Means for maintaining the saw in proper position is particularly required when the saw is idling and no cutting pressure is being exerted against the saw teeth. To effect this, the forward faces of the head 5 are inclined downwardly to the rear with respect to the vertical ways 6 so that the axes of the two drums 60 and 61 are inclined downwardly to the front from the perpendicular to the line of travel of the saw S, as indicated in somewhat exaggerated form by the angle A in Fig. 2. This departure from the perpendicular need only be small, such as an angle of 2° for example. Also, the peripheral surfaces of the drums 60 and 61 are on a slight bevel of about 1°, that is, the diameter of each drum at the forward edge is slightly greater than the diameter at the rear, as indicated by the angle B in Fig. 3.

Another important feature of the mechanism, which cooperates with the saw pulling and restraining means to provide a high capacity machine with low band saw deterioration or breakage, resides in the manner of manipulating the return run or flight of the saw. From the pulling chains around to the brake drums, the band is maintained in a freely running large open loop substantially free of tension and having no sharp bends therein, as illustrated generally in Fig. 1. The radius of the path of travel of the saw is at all points of a value of at least one foot, and preferably of one and one-half feet or more. To insure this relation, the saw at the upper portion of its free return run is supported on the arm 9 by means of fairly closely spaced small rolls 95 alternately arranged on opposite sides of the saw. At the extreme outer end of the arm 9, there is also mounted a roll 96 having an axis at right angles to the plane of the saw at that point and adapted to bear against the toothed edge of the blade to hold the saw in position on the arm 9 between the series of rolls 95. The surface of the roll 96 is of a relatively soft material, such as brass, so as not to injure the saw teeth. The arrangement has the further advantage that saw bands of different length may be employed without changing the adjustment or relations; and also the head 5 together with its associated elements may be vertically adjusted to suit the work without regard to the length of the saw band.

A pair of guide and supporting rolls is located above and below the working area 12. These pairs of rolls are similar, one such pair being shown in Fig. 5. The upper pair of rolls 98 and 99, for example, is mounted on a bracket 100, and are freely rotatable thereon, the bracket 100 being secured to the adjustable head 5. Roll 98 is provided with an enlarged annular flange 101 forming a shoulder against which the back edge of the saw engages. Each of the rolls is provided with enlarged annular portions 102 arranged in opposed relation and adapted to engage between them the saw S. The outer one of the annular portions 102 is spaced inwardly from the toothed edge of the saw band so as not to engage the toothed portion and to provide a widened space at the outer edges between the rolls to accommodate the set of the saw teeth. The lower pair of guiding and supporting rolls 103 and 104 are similar to the upper pair and are rotatably mounted on a bracket 105 secured to the main frame portion 1.

The power driving means for the band saw may be of any type suitable for the purpose, and as here more or less diagrammatically illustrated, comprises an electric motor 106 adapted to supply rotary power to the reduction and change speed gear box 107, from which leads a shaft 108 connected by suitable sprocket and chain mechanism 109 to drive the shaft 23 connected to the flexible chain propelling means for the saw. The table 4, on which the work-piece is mounted, is adapted to be fed in any suitable manner, either by mechanical screw means or by a hydraulically powered cylinder. The former is illustrated generally in Figs. 1 and 2, and comprises a power takeoff shaft 110 leading from the gear box 107 and connected through bevel gear means to the shaft 111 which in turn is connected through bevel gearing to drive shaft 112 and further bevel gearing to rotate the shaft 113 which through suitable screw and nut means serves to translate the table 4.

Fig. 9 illustrates in diagrammatic form a hydraulic means for feeding the table 4a and comprises a cylinder 114 having therein the piston 115 connected to the slidable table 4a. In many cases, it is desirable to provide a variable rate of feed for the work table, as for example, in cutting a work-piece of irregular shape, having a variable cross-section. When the saw is operating on a relatively small area, the feed may, of course, be increased without damage to the saw, and with a suitable hydraulic control arrangement, this may be readily accomplished. For example, if an excess of hydraulic fluid at a given pressure is available for supply through the line 116 to the cylinder 114 during the feeding stroke, a predetermined pressure will be exerted on the piston 115 and the table will be fed at a rate proportionate to the resistance. As a diagrammatic illustration, the supply line 116 to the feeding end of the cylinder 114 may be provided with an adjustable relief valve 117 set to maintain a constant pressure in the feed line and release the excess liquid.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In an endless band saw machine, means for restraining the advance of the band comprising a pair of rolls between which the saw band is gripped, means for applying a brake to one of said rolls, the peripheral surfaces of the rolls being tapered on a small angle with the smaller diameter at the rear toward the back edge of the band, guide means adapted to be engaged by the back edge of the saw band to limit its path of travel, and a pulling mechanism for said band comprising a plurality of pairs of opposed gripping elements operating in series on said band in a straight line, the portion of said band under tension throughout the restraining and pulling region being maintained straight.

2. In an endless band saw machine, means for restraining the advance of the band comprising a pair of rolls between which the band saw is gripped, means for applying a brake to one of said rolls, a pulling mechanism for said band comprising a plurality of pairs of opposed gripping elements operating in series on said band in a straight line, means adapted to be engaged by the back edge of the saw band to limit its path of travel, said rolls being mounted respectively on axes inclined at a small angle from the perpendicular in the direction of travel of the saw band tending to cause the band to be maintained against said limiting means, the portion of said band under tension throughout the restraining and pulling region being maintained straight.

3. In an endless band saw machine, band advancing means and a band restraining means spaced from said advancing means to provide a saw working region with the saw therein under high tension, said restraining means comprising a pair of rolls arranged to grip the saw band between their peripheral surfaces, a brake mechanism connected to operate on one of said rolls, said rolls having their peripheral surfaces tapered at a small angle with the respective axes with the smaller diameter at the rear edge of the saw band and also having their respective axes inclined at a small angle from the perpendicular in the direction of travel of the saw band, and means adapted to be engaged by the back edge of the saw band to limit its path of travel.

4. In an endless band saw machine, band advancing means and a band restraining means spaced from said advancing means to provide a saw working region with the saw therein under high tension, said restraining means comprising a pair of rolls arranged to grip the saw band between their peripheral surfaces, one of said rolls being provided with an enlarged flange to limit the path of travel of the back edge of the saw band, a brake mechanism connected to operate on one of said rolls, said rolls having their peripheral surfaces tapered at a small angle with the respective axes with the smaller diameter at the rear edge of the saw band and also having their respective axes inclined at a small angle from the perpendicular in the direction of travel of the saw band.

5. An endless metal cutting band saw machine having, in combination, a band restraining means and a band pulling means spaced apart to provide a saw working region, said pulling means comprising a pair of endless chains supported for movement along opposed parallel paths and carrying gripping plates, means positioned to cause opposed pairs of said plates to grip firmly and advance the band, and a pair of guide rolls for said band at each side of said saw working region adapted to receive and support the band between the rolls of each pair, one of the rolls of each pair having a peripherally projecting flange portion adapted to be engaged by and support the back edge of the saw band, said band being postively maintained in a straight line throughout the entire portion extending through said restraining means, working region and pulling means.

6. In an endless band saw machine, a work support and a saw head and means for effecting a relative feed between the two, means for advancing the saw under tension through the cutting area, a pivoted supporting means for the return run of the saw band adapted to maintain it in a wide loosely running open loop free of tension, and a movable part positioned and arranged to be engaged by the work-piece in advance of any engagement by the work-piece of said return run of the saw band and provided with a connection to swing said supporting means and said loosely running portion of the saw band on said pivot and prevent any interference between the work-piece and the return run of the saw band.

7. In an endless band saw machine, a work support and a saw head and means for effecting a relative feed between the two, means for advancing the saw with a section in the cutting area under tension comprising a restraining means and a pulling means arranged respectively on opposite sides of said working area, a pivoted supporting means for the return run of the saw band having guides for maintaining it in an open loosely running loop, a movable part positioned and arranged to be engaged by an elongated work-piece in advance of any engagement by the work-piece of said return run of the saw band, and a connection from said part arranged upon movement thereof to swing said supporting means with the said loosely running portion of the saw band on its pivot independently of the portion in the cutting area and prevent interference between the work-piece and the return run of the saw band.

MICHAEL JOSEPH RADECKI.
JOSEPH ANTHONY KROLIKOWSKI.

REFERENCES CITED

The following references are of record in the file of this patent:

UNITED STATES PATENTS

| Number | Name | Date |
|---|---|---|
| 6,432 | Hedge | May 8, 1849 |
| 428,785 | Rodgers | May 27, 1890 |
| 499,162 | Emerson | June 6, 1893 |
| 548,637 | Greenfield | Oct. 29, 1895 |
| 619,490 | Lawrence | Feb. 14, 1899 |
| 935,395 | Napier | Sept. 28, 1909 |
| 1,139,884 | Mellen | May 18, 1915 |
| 1,287,193 | Berry | Dec. 10, 1918 |
| 1,776,775 | Biggert | Sept. 30, 1930 |
| 2,081,962 | Terhune | June 1, 1937 |

FOREIGN PATENTS

| Number | Country | Date |
|---|---|---|
| 14,026 | Great Britain | Mar. 20, 1852 |